United States Patent [19]
McDaniel et al.

[11] Patent Number: 5,644,555
[45] Date of Patent: Jul. 1, 1997

[54] MULTIPLE DATA SURFACE MAGNETO-OPTICAL DATA STORAGE SYSTEM

[75] Inventors: Terry Wayne McDaniel, Morgan Hill; Harris Anthony Notarys, San Jose; Hal Jervis Rosen, Los Gatos; Kurt Allan Rubin, Santa Clara, all of Calif.

[73] Assignee: International Business Machines Corporation, Armonk, N.Y.

[21] Appl. No.: 376,943

[22] Filed: Jan. 19, 1995

[51] Int. Cl.$^6$ .................................................. G11C 13/06
[52] U.S. Cl. ........................... 369/13; 369/14; 369/114
[58] Field of Search ........................ 369/13, 14, 275.2, 369/275.4, 275.1; 360/114

[56] References Cited

U.S. PATENT DOCUMENTS

| | | | |
|---|---|---|---|
| 3,946,367 | 3/1976 | Wohlmut et al. | 340/173 LM |
| 3,999,009 | 12/1976 | Bouwhis | 358/128 |
| 4,219,704 | 8/1980 | Russell | 179/100.3 B |
| 4,298,975 | 11/1981 | van der Veen et al. | 369/94 |
| 4,450,553 | 5/1984 | Holster et al. | 369/275 |
| 4,668,550 | 5/1987 | Tajima et al. | 428/65 |
| 4,682,321 | 7/1987 | Takaoka et al. | 369/284 |
| 4,737,427 | 4/1988 | Miyazaki et al. | 430/19 |
| 4,829,505 | 5/1989 | Boyd et al. | 369/94 |
| 4,845,021 | 7/1989 | Miyazaki et al. | 430/495 |
| 4,852,077 | 7/1989 | Clark et al. | 369/284 |
| 4,860,273 | 8/1989 | Sawano et al. | 369/100 |
| 4,905,215 | 2/1990 | Hattori et al. | 369/14 |
| 5,031,172 | 7/1991 | Umeda et al. | 369/275.001 |
| 5,077,120 | 12/1991 | Kato et al. | 428/200 |
| 5,097,464 | 3/1992 | Nishiuchi et al. | 369/112 |
| 5,132,960 | 7/1992 | Hosokawa et al. | 369/284 |
| 5,202,875 | 4/1993 | Rosen et al. | 369/94 |
| 5,224,068 | 6/1993 | Miyake et al. | 369/13 |
| 5,232,790 | 8/1993 | Arimune et al. | 369/13 |
| 5,492,773 | 2/1996 | Sekiya et al. | 369/13 |

FOREIGN PATENT DOCUMENTS

| | | | |
|---|---|---|---|
| 0192244 | 8/1986 | European Pat. Off. | G11B 7/24 |
| 0289352 | 11/1988 | European Pat. Off. | G11B 7/24 |
| 0368442 | 5/1990 | European Pat. Off. | G11B 7/24 |
| 0414380 | 2/1991 | European Pat. Off. | G11B 7/135 |
| 3724622 | 1/1988 | Germany | G11B 7/013 |
| 5862838 | 4/1983 | Japan | G11B 7/24 |
| 60202545 | 10/1985 | Japan | G11B 7/00 |
| 60219647 | 11/1985 | Japan | G11B 7/24 |
| 63276732 | 11/1988 | Japan | G11B 13/00 |
| 169753 | 7/1989 | Japan | G11B 7/24 |
| 3080443 | 4/1991 | Japan | G11B 7/24 |
| 3122847 | 5/1991 | Japan | G11B 11/10 |
| 1516413 | 7/1978 | United Kingdom | G11B 7/24 |
| 2017379 | 10/1979 | United Kingdom | G11B 7/24 |
| 2205173 | 11/1988 | United Kingdom | G02F 3/00 |

OTHER PUBLICATIONS

IBM TDB "Optical Disk Family" vol. 30, No. 2, Jul. 1987, pp. 667–669, N. K. Arter et al.

*Primary Examiner*—David C. Nelms
*Assistant Examiner*—Vu A. Le
*Attorney, Agent, or Firm*—Douglas R. Millett; Noreen A. Krall

[57] ABSTRACT

An optical data storage system comprises an optical disk drive and a multiple data surface magneto-optical medium. The medium comprises a substrate, a first dielectric layer, a first magneto-optical data layer, a second dielectric layer, a transmissive member, a third dielectric layer, a second magneto-optical data layer, a fourth dielectric layer, and a reflector layer. The thicknesses of the magneto-optical and dielectric layers are selected to maximize the magneto-optical read out signal received from the data layers. The disk drive includes a phase retarder for improving the signal from the magneto-optical data layers.

23 Claims, 5 Drawing Sheets

MULTIPLE DATA SURFACE MAGNETO-OPTICAL DATA STORAGE SYSTEM

BACKGROUND OF THE INVENTION

1. Field of the Invention

This invention relates generally to optical data storage systems and more specifically to a data storage system having multiple data surfaces.

2. Description of the Prior Art

Optical data storage systems provide a means for storing great quantities of data on a disk. The data is accessed by focussing a laser beam onto the data layer of the disk and then detecting the reflected light beam. Various kinds of systems are known. In a ROM (Read Only Memory) system, data is permanently embedded as marks in the disk at the time of manufacture of the disk. The data is detected as a change in reflectivity as the laser beam passes over the data marks. A WORM (Write Once Read Many) system allows the user to write data by making permanent marks, such as pits. Once the data is recorded onto the disk it cannot be erased. The data in a WORM system is also detected as a change in reflectivity.

Erasable optical systems are also know. These systems use a laser to heat the data layer above a critical temperature in order to write and erase the data. Magneto-optical recording systems record data by orienting magnetic domains of a spot on the data layer in either an up or down position in order to form a recorded mark. The data is read by directing a low power laser to the data layer. The differences in magnetic domain magnetization direction of the recorded marks on the data layer cause the plane of polarization of the light beam to be rotated one way or the other, clockwise or counter clockwise. This change in orientation of polarization is then detected.

In order to increase the storage capacity of an optical disk, multiple data layer systems have been proposed. An optical disk having two or more data layers may in theory be accessed at different layers by changing the focal position of the lens. Examples of this approach include U.S. Pat. No. 5,202,875 issued Apr. 13, 1993 by Rosen et al; U.S. Pat. No. 5,097,464 issued Mar. 17, 1992 by Nishiuchi et al; and U.S. Pat. No. 4,450,553 issued May 22, 1984 by Holster et al.

One problem with using multiple data surface magneto-optical media is that the magneto-optical material is highly absorptive of light. Multiple data surface media require that the upper data layers allow light to pass through to the lower data layers. The magneto-optical material tends to absorb a high percentage of the light, and so the small amount of light received from the lower data surfaces results in a weak data signal. What is needed is a magneto-optical multiple data surface system which provides a good signal from even the lower data layers, as well as allowing writing and erasing with reasonable laser powers on all data layers.

SUMMARY OF THE INVENTION

In a preferred embodiment of the invention, an optical data storage system comprises an optical disk drive and a multiple data surface magneto-optical medium. The medium is comprised of a substrate, a first dielectric layer overlying the substrate, a first magneto-optical layer overlying the first dielectric layer, a second dielectric layer overlying the first magneto-optical layer, a light transmissive layer overlying the second dielectric layer, a third dielectric layer overlying the light transmissive layer, a second magneto-optical layer overlying the third dielectric layer, a fourth dielectric layer overlying the second magneto-optical layer, and a reflective layer overlying the fourth dielectric layer. The thickness of the magneto-optical layers and the dielectric layers are selected such that the signal to noise ratio is high from both magneto-optical layers. This requires that the first magneto-optical layer be highly transmissive of light, since the second magneto-optical layer is read by passing light through the first magneto-optical layer.

For a fuller understanding of the nature and advantages of the present invention, reference should be made to the following detailed description taken in conjunction with the accompanying drawings.

DESCRIPTION OF THE PREFERRED EMBODIMENT

Figure 1:
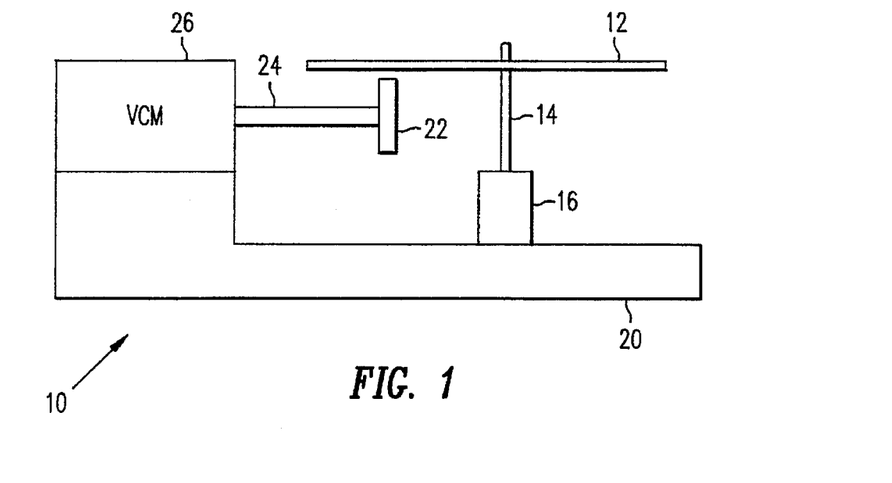
FIG. 1 is a schematic diagram of an optical data storage system of the present invention.

FIG. 1 shows a schematic diagram of an optical data storage system of the present invention and is designated by the general reference number 10. System 10 includes an optical data storage medium 12 which is preferably disk shaped. Medium 12 is removably mounted on a clamping spindle 14 as is known in the art. Spindle 14 is attached to a spindle motor 16 which in turn is attached to a system chassis 20. Motor 16 rotates spindle 14 and medium 12.

An optical head 22 is positioned below medium 12. Head 22 is attached to an arm 24 which in turn is connected to an actuator device, such as a voice coil motor 26. Voice coil motor 26 is attached to chassis 20. Motor 26 moves arm 24 and head 22 in a radial direction below medium 12.

Figure 2A:
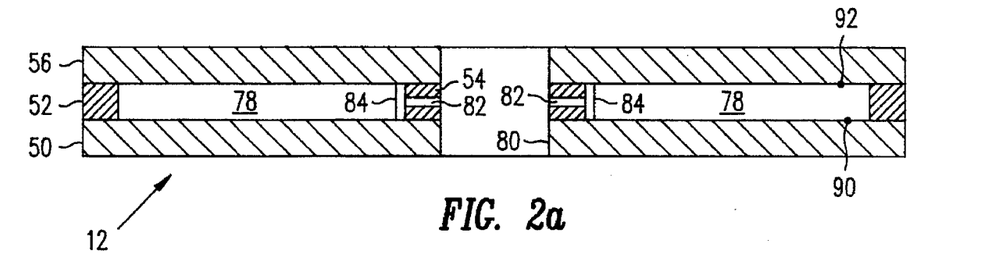
FIG. 2A is a cross-sectional view of an optical medium of the present invention.

FIG. 2A is a cross sectional view of medium 12. Medium 12 has a substrate 50. Substrate 50 is also known as a face plate or cover plate and is where the laser beam enters medium 12. An outer diameter (OD) rim 52 and an inner diameter (ID) rim 54 are attached between substrate 50 and a substrate 56. Substrate 50 is made of a light transmissive material such as glass, polycarbonate or other polymer material. Substrate 56 may be made of a similar material to substrate 50 or may be made of a material that is not transmissive of light in embodiments where the light does not have to pass through the substrate 56. In a preferred embodiment, substrate 50 is 1.2 millimeters thick and substrate 56 is 1.2 millimeters thick. The substrate 56 may alternatively have thicknesses of 0.2–1.2 millimeters. The ID and OD rims are preferably made of a plastic material and approximately 500 microns thick. The rims may alternatively have thicknesses of 20–1000 microns.

The rims may be attached to the substrates by means of glue, cement, or other bonding process. The rims may alternatively be integrally formed in the substrate 50 or substrate 56. When in place, the rims form an annular space 78 between the substrates. A spindle aperture 80 passes through medium 12 inside the ID rim 54 for receiving the spindle 14. A plurality of passages 82 are provided in the ID rim 54 connecting the aperture and the space 78 to allow pressure equalization between the space 78 and the surrounding environment of the disk file, which would typically be air. A plurality of low impedance filters 84 are attached to passages 82 to prevent contamination of space 78 by particulate matter in the air. Filter 84 may be quartz or glass fiber. Passages 82 and filters 84 could alternatively be located on the OD rim.

Substrate 50 has a data surface 90 and substrate 56 has a data surface 92. Surfaces 90 and 92 each contain a magneto-optical data layer which is described in more detail below. The substrate 50 and substrate 56 have optical tracking grooves or marks and/or header information formed into the surfaces adjacent data surfaces 90 and 92, respectively, by either a photo polymer process or embossing process. Alternatively, the tracking features may be pits formed in the substrates or recorded marks in the data layer.

Figure 2B:
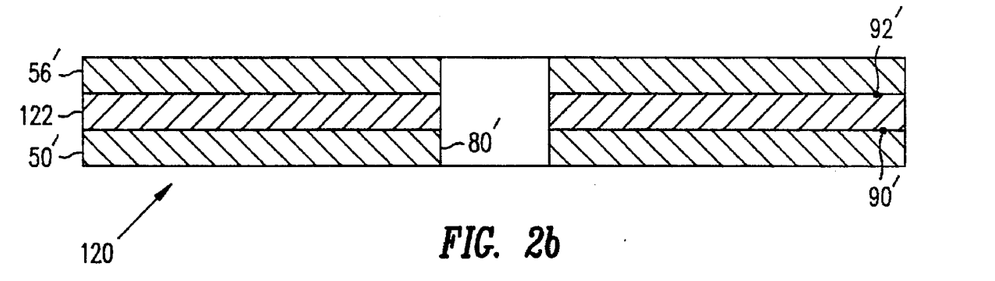
FIG. 2B is a cross-sectional view of an alternative optical medium of the present invention.

FIG. 2B is a cross sectional view of an alternative embodiment of an optical recording medium and is designated by the general reference 120. Elements of medium 120 which are similar to elements of medium 12 are designated by a prime number. Medium 120 does not have the rims and space 78 of medium 12. Instead, a solid transparent member 122 separates the face plate 50' and substrate 56'. In a preferred embodiment, the member 122 is made of an optical cement which also serves to hold the substrates 52' and 56' together. The thickness of member 122 is preferably approximately 20–300 microns. Medium 120 may be substituted for medium 12 in system 10. The data surfaces 90' and 92' contain magneto-optical data layers and are described in more detail below.

Figure 2C:
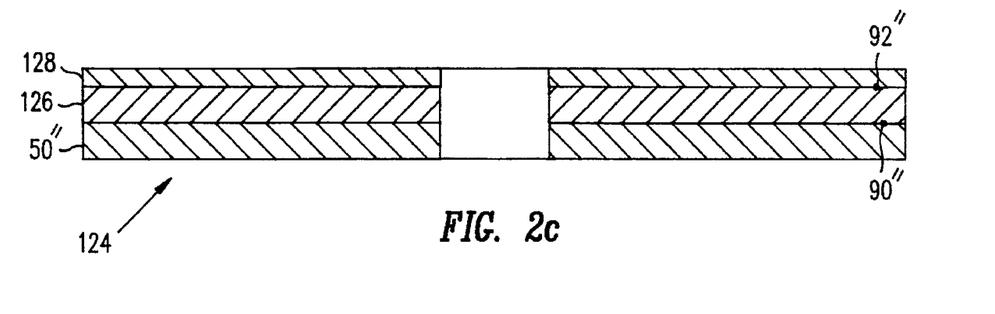
FIG. 2C is a cross-sectional view of an alternative optical medium of the present invention.

FIG. 2C is a cross-sectional view of another alternative embodiment of the optical recording medium and is designated by the general reference number 124. Elements of medium 124 which are similar to elements of medium 12 or 120 are designated by double prime numbers. Medium 124 does not use two separate substrates as in the previous embodiments, but instead builds a multilayer structure from the single substrate 50". The data surfaces 90" and 92" are separated by a solid layer 126. Layer 126 is a dielectric light transmissive layer which is formed by either lamination or deposition (such as photo polymer or spin coating) onto surface 90". In a preferred embodiment, the light transmissive layer 126 is made of a polymer material such as polycarbonate. The top surface of layer 126 has tracking grooves and/or header information formed into its surface by either a photo polymer process or embossing. The data layer 92" is then deposited on top of layer 126. A final protective layer of polymer material is then deposited onto data surface 92".

Figure 3:
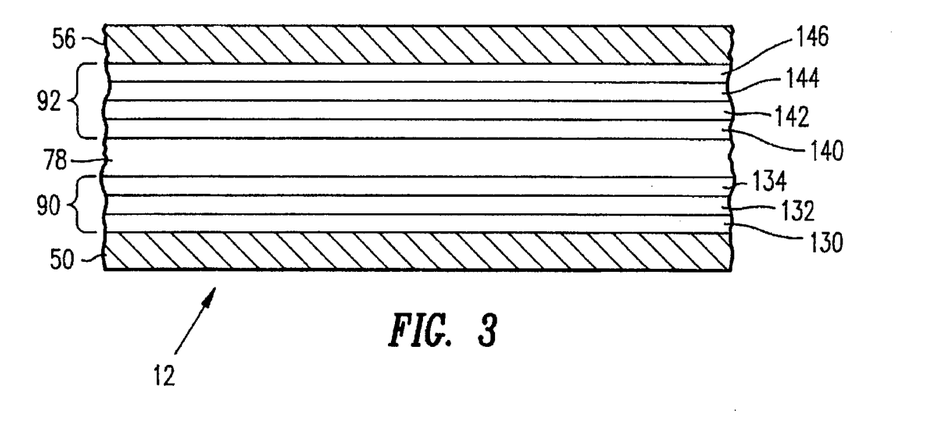
FIG. 3 is a detailed cross-sectional view of the medium of FIG. 2A.

FIG. 3 shows a detailed cross sectional view of medium 12. Medium 12 has a first dielectric layer 130 overlying substrate 50. Layer 130 is made of a dielectric material which is transparent and chemically stable such as nitrides, carbides or oxides. Some of the preferred materials are SiN, AlN, SiC, and SiOx. A first magneto-optical layer 132 overlies layer 130. Magneto-optical layer 132 is made of a magneto-optical material. Several classes of magneto-optical materials may be used. One example is a mixture containing at least one rare earth element and at least one transition metal. A preferred embodiment is an amorphous alloy of TbFeCo. Alternatively, TbFeCo with additions of other rare earth elements, such as Nd or Pr may be used. Another class of magneto-optical materials is the Cobalt-noble metal systems. The noble metals include Pt, Pd, and Ru. The Cobalt-noble metal systems could be in the form of an alloy or a multi-layer system consisting of alternating layers of Co and the noble metals. Other classes of magneto-optical materials include garnets, MnBi and Heusler alloys. First magneto-optical layer 132 may be of a thickness which will allow at least 30% light transmission. If a rare earth-transition metal is used for layer 132, the thickness should be between 4 nm and 15 nm (preferably 10 nm). The other magneto-optical materials may also be used in layer 132 and may have greater layer thicknesses, but in any event must still allow at least 30% light transmission. A second dielectric layer 134 overlies magneto-optical layer 132 and is preferably made of the same dielectric material as layer 130.

Overlying layer 134 is the air space 78, or in the case of medium 120 this would be the solid member 122, and in the case of medium 124 this would be solid layer 126. Overlying space 78 is a third dielectric layer 140. Dielectric layer 140 is preferably made of the same dielectric material as layer 130. A second magneto-optical layer 142 overlies layer 140. The second magneto-optical layer 142 is made of the same material as layer 132. The second magneto-optical layer 142 is of a thickness of between 10 nm and 100 nm (preferably 20 nm). A fourth dielectric layer 144 overlies second magneto-optical layer 144. Dielectric layer 144 is preferably made of the same material as layer 130. A chemically stable reflector layer 146 overlies layer 144. Reflector layer 146 is made of a reflective material such as aluminum alloys or noble metals and their alloys and is of a thickness of between 5 nm and 100 nm. The substrate 56 overlies reflector 146.

In a preferred method of manufacture, layers 130, 132 and 134 are successively deposited onto substrate 50. Layers 146, 144, 142 and 140 are successively deposited onto substrate 56. Then substrates 50 and 56 are combined with rims 52 and 54 as shown in FIG. 2A. In the case of medium 120 of FIG. 2B, the substrates 50' and 56' with the deposited layers are glued together with an optical cement. In the case of medium 124 of FIG. 2C, all of the layers are deposited successively onto substrate 50".

In order to achieve high signal to noise ratios from the data surfaces 90 and 92 it is necessary to chose the thicknesses of the dielectric layers 130, 134, 140 and 144 such that they have certain values. The appropriate thickness ranges are shown in table I below. The first and third cases refer to the medium 12. The second and fourth cases both refer to the media 120 and 124. The embodiments of the first two cases of the table I are designed for use in an optical disk drive system which does not have a phase retarder. The third and fourth cases of table I are embodiments which may be used in an optical disk drive which does have a phase retarder. The use of a phase retarder in an optical drive is explained in more detail below. The first and third cases each have two different embodiments.

High signal to noise designs can also be achieved by adding or subtracting the distance equal to $\lambda/2$ n to the dielectric thickness range numbers shown in the following table, where $\lambda$ is the laser wavelength and n is the index of refraction of the dielectric layers. For $\lambda=680$ nm and n=2.0

(for a dielectric layer of SiN) as used in the calculations in the table, $\lambda/2$ n=170 nm. This periodic interference effect is explained in more detail in the article by T. W. McDaniel, K. A. Rubin, and B. I Finkelstein, "Optimum Design of Optical Storage Media For Drive Compatibility", IEEE Trans. Magn., Vol. 30, p 4413–4415, November 1994.

TABLE I

| CASE | Dielectric Thickness Ranges | | | |
|---|---|---|---|---|
| | Layer 130 Thickness Range (nm) | Layer 134 Thickness Range (nm) | Layer 140 Thickness Range (nm) | Layer 144 Thickness Range (nm) |
| #1 | 0–166 | 80–160 | 80–250 | 90–240 |
| Medium 12/ no phase retarder | 0–78 | 23–64 | 80–250 | 90–240 |
| #2 | 95–170 | 85–150 | 85–250 | 105–215 |
| Medium 120 or 124/no phase retarder | | | | |
| #3 | 0–160 | 35–115 | 110–210 | 25–120 |
| Medium 12/ phase retarder with phase shift = 90° | 0–160 | 35–115 | 80–130 | 150–170 |
| #4 | 10–140 | 20–130 | 105–210 | 30–125 |
| Medium 120 or 124/phase retarder with phase shift = 65° | | | | |

The optimal thicknesses shown in Table I were derived for an optical medium having a polycarbonate substrate (index of refraction n=1.58), dielectric layers of silicon nitride (n=2.025–j0.01; where j equals the square root of –1), magneto-optical layers of TbFeCo (n+=3.064–j3.073, n–=3.196–J3.187, where n+ and n– are the indexes of refraction for right and left circularly polarized light, respectively, for a first magneto-optical layer of 10 nm thickness and a second magneto-optical layer of 20 nm thickness), and an aluminum reflector layer (n=1.79–j6.81). The medium was used in an optical drive using a laser at wavelength 680 nm. The optimal dielectric layer thickness values were determined by calculating the values for dielectric thicknesses which obtained the maximum return signal from the medium. Standard optical theoretical formulas were used to determine the reflectance, absorbance, and transmittance of the layers in the medium, and the Kerr rotation angle of light reflected from the medium, for normally incident light at 680 nm. A high signal was achieved when the returning light from the magneto-optical layers has a relatively high Kerr rotation angle and light intensity. A more detailed discussion of these standard optical formulas is given in references such as O. Heavens, "Optical Properties Of Thin Solid Films", Academic, N.Y., 1955; P. Yeh, "Optics Of Anisotropic Layered Media: A New 4×4 Matrix Algebra", Surf. Sci., 41, 1980; M. Mansuripur, "Analysis Of Multilayer Thin-Film Structures Containing Magneto-Optic and Anisotropic Media At Oblique Incidence Using 2×2 Matrices", J. Appl. Physics, 6466, 1990; K. Egashira and T. Yamada, "Kerr Effect Enhancement And Improvement Of Readout Characteristics In MnB: Film Memory", J. Appl. Physics, 3643, 1974.

Figure 4:
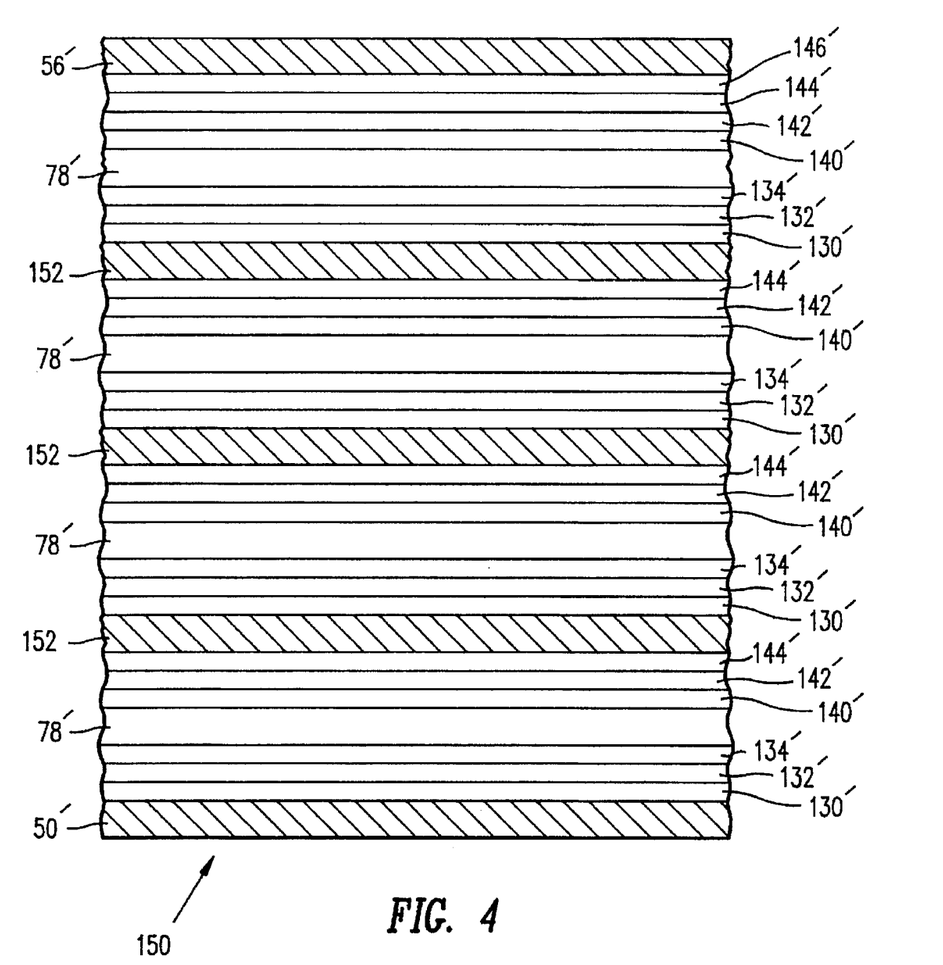
FIG. 4 is a detailed cross-sectional view of an alternative medium of the present invention.

FIG. 4 shows a detailed cross sectional view of an alternative embodiment of the medium of the present invention and is designated by the general reference number 150.

Elements of medium 150 which are similar to elements of medium 12 are designated by a prime number. Medium 150 shows how the magneto-optical medium of the present invention may be extended to more than two magneto-optical layers. Medium 150 shows eight magneto-optical layers. Additional intermediate substrates 152 have been added and may be separated using additional rims similar to rims 52 and 54 to form the intervening air spaces 78'.

The medium 120 and 124 may also be extended to more than two data layers similar to medium 150. In such a case, a plurality of layers 122 or 126 are substituted for substrates 152 and air spaces 78'.

Figure 5:
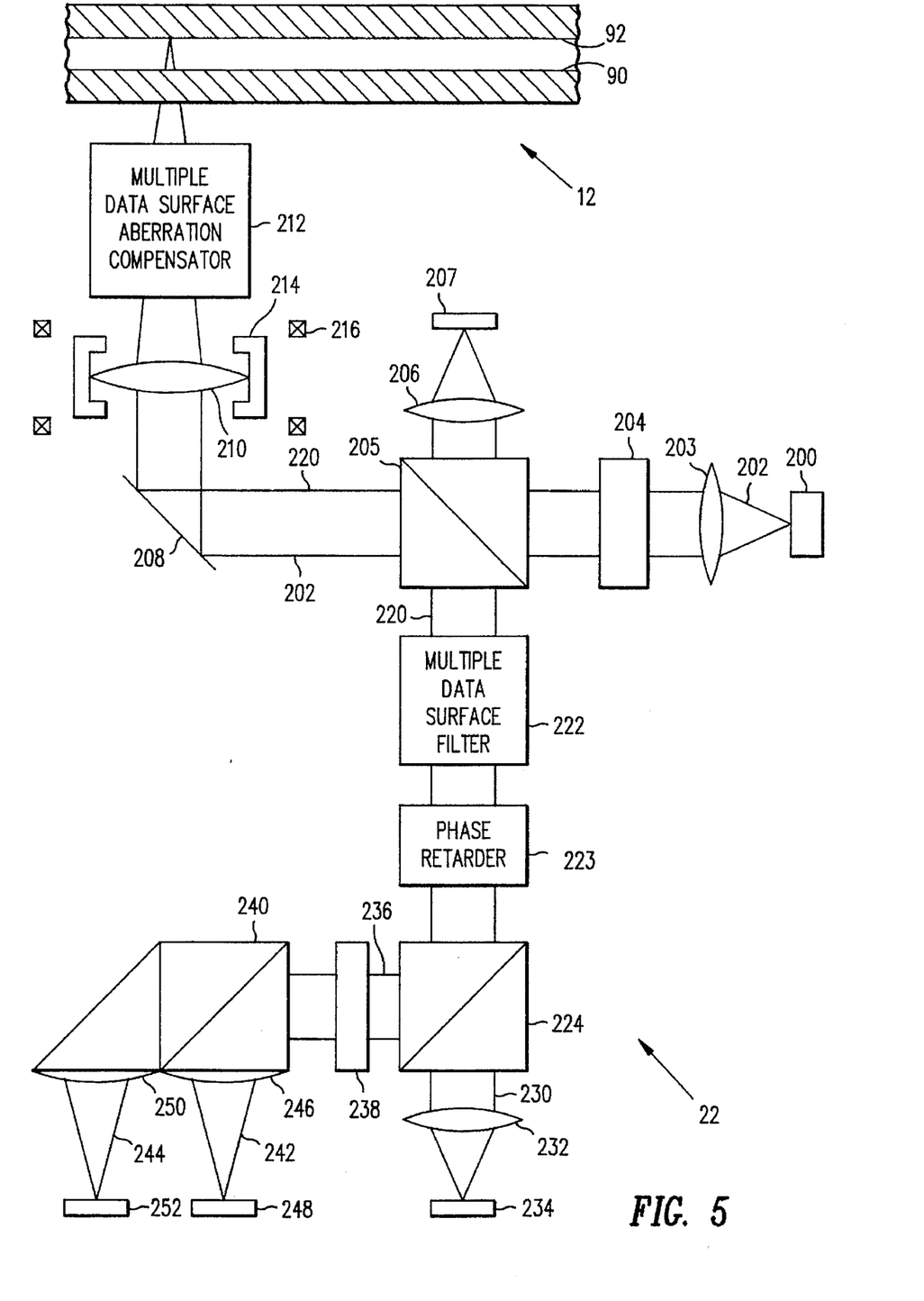
FIG. 5 is a schematic diagram of an optical head and medium of the present invention.

FIG. 5 shows a schematic diagram of an optical head 22 and medium 12. Optical head 22 has a laser diode 200. Laser 200 may be a gallium-aluminum-indium-phosphorous diode laser which produces a primary beam of light 202 at approximately 680 nanometers wavelength. Beam 202 is collimated by lens 203 and is circularized by a circularizer 204 which may be a circularizing prism. Beam 202 passes to a beamsplitter 205. A portion of beam 202 is reflected by beamsplitter 205 to a focus lens 206 and an optical detector 207. Detector 207 is used to monitor the power of beam 202. The rest of beam 202 passes to and is reflected by a mirror 208. Beam 202 then passes through a focus lens 210 and a multiple data surface aberration compensator 212 and is focussed onto one of the data surfaces (surface 92 as shown) of medium 12. Lens 210 is mounted in a holder 214. The position of holder 214 is adjusted relative to medium 12 by a focus actuator motor 216 which may be a voice coil motor.

A portion of the light beam 202 is reflected at the data surface as a reflected beam 220. Beam 220 returns through compensator 212 and lens 210 and is reflected by mirror 208. At beamsplitter 205, beam 220 is reflected to a multiple data surface filter 222. The beam 220 passes to a phase retarder 223. Phase retarder 223 in a preferred embodiment is a birefringent crystal that produces a phase shift between the S and P polarization components of the light reflected back from the optical medium. The relative amount of phase shift is adjusted by tilting the birefringent crystal to a desired angle relative to the light such that elliptically polarized light entering the crystal is converted to linearly polarized light exiting the crystal. This optimizes the Kerr effect of the returning light beam and helps achieve a maximum signal for purposes of reading the recorded data. A more detailed description of phase retarder is given in "Optics", by E. Hecht and Alfred Zajac, Addison-Wesley Publishing Company, (1975), p 246. Phase retarder 223 adjusts the phase of the returning light beam such that the return signal is optimized. It is desirable that the phase retarder 223 be adjustable so that the drive can work with both the multiple data surface magneto-optical disks of the present invention and the single magneto-optical layer media of the prior art. The phase retarder could also have a fixed retardation necessary for maximizing the signal of multiple data layer disks and be moved out of the optical path for standard single data layer disks which do not require phase retardation.

The beam 220 passes from phase retarder 223 to a beamsplitter 224. At beamsplitter 224 a first portion 230 of beam 220 is directed to an astigmatic lens 232 and a quad optical detector 234. At beamsplitter 224 a second portion 236 of beam 220 is directed through a half waveplate 238 to a polarizing beamsplitter 240. Beamsplitter 240 separates light beam 236 into a first orthogonal polarized light component 242 and a second orthogonal polarized light component 244. A lens 246 focusses light 242 to an optical detector 248 and a lens 250 focusses light 244 to an optical detector 252.

The multiple data surface aberration compensator 212, multiple data surface filter 222, as well as the general operation of a multiple data surface optical data storage system is discussed in more detail in U.S. Pat. No. 5,202,875 issued Apr. 13, 1993 by Rosen et al, and is incorporated herein by reference.

Figure 6:
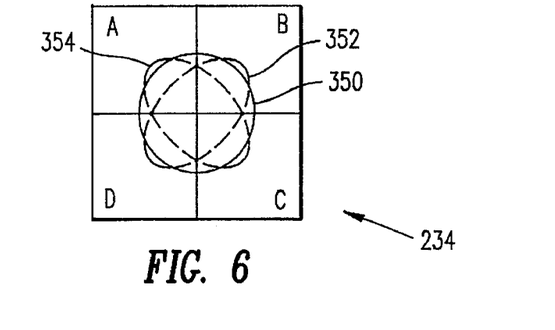
FIG. 6 is a top view of an optical detector of FIG. 5.

FIG. 6 shows a top view of a quad detector 234. The detector 234 is divided into four equal sections 234A, B, C and D.

Figure 7:
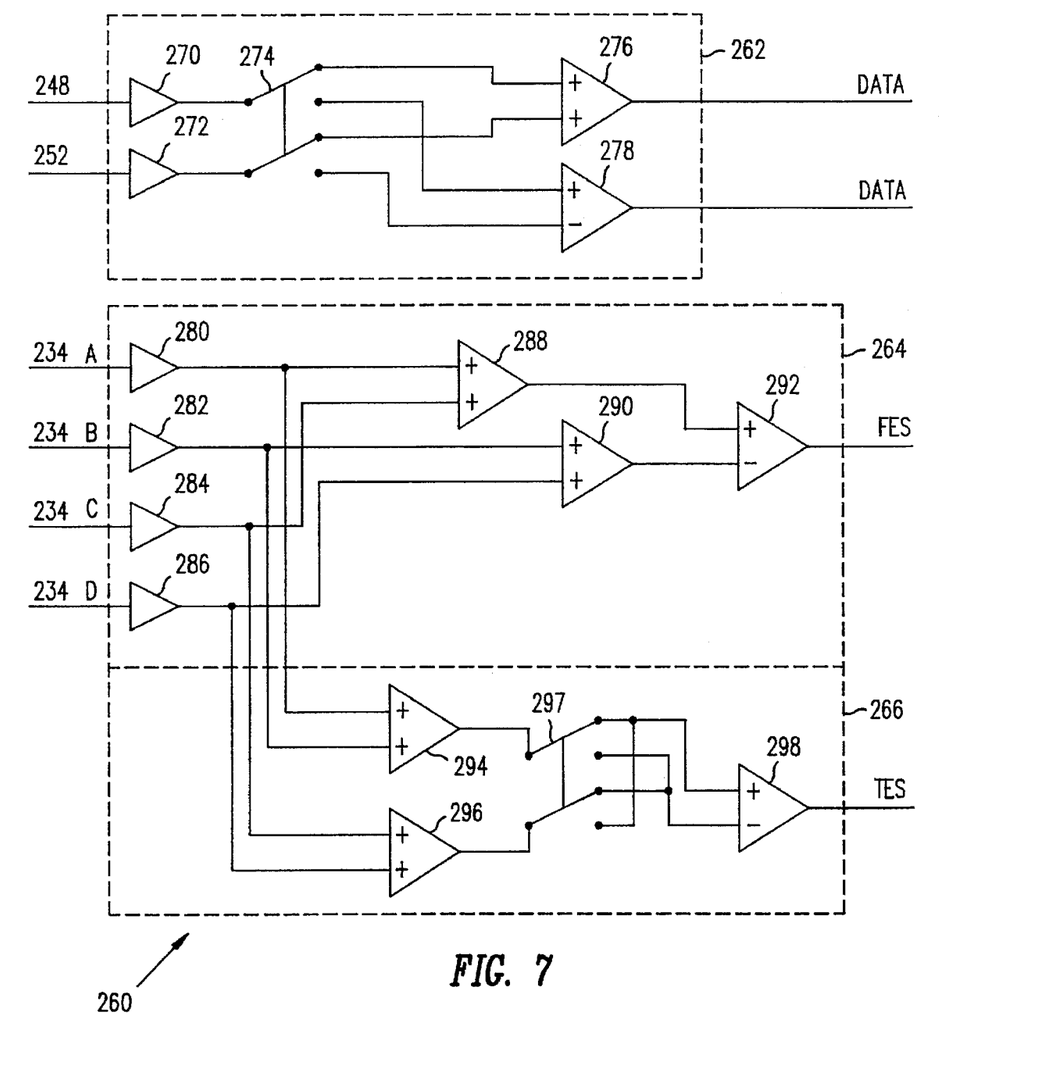
FIG. 7 is a circuit diagram of a channel circuit of the present invention.

FIG. 7 shows a circuit diagram of a channel circuit 260. Circuit 260 comprises a data circuit 262, a focus error circuit 264 and a tracking error circuit 266. Data circuit 262 has an amplifier 270 connected to detector 248 and an amplifier 272 connected to detector 252. Amplifiers 270 and 272 are connected to a double pole, double throw electronic switch 274. Switch 274 is connected to a summing amplifier 276 and a differential amplifier 278.

Circuit 264 has a plurality of amplifiers 280, 282, 284 and 286 connected to detector section 234A, B, C and D, respectively. A summing amplifier 288 is connected to amplifiers 280 and 284, and a summing amplifier 290 is connected to amplifiers 282 and 286. A differential amplifier 292 is connected to summing amplifiers 288 and 290.

Circuit 266 has a pair of summing amplifiers 294 and 296, and a differential amplifier 298. Summing amplifier 294 is connected to amplifiers 280 and 282 and summing amplifier 296 is connected to amplifiers 284 and 286. Differential amplifier 298 is connected to summing amplifiers 294 and 296 via a double pole double throw electronic switch 297. Switch 297 acts to invert the inputs to amplifier 298.

Figure 8:
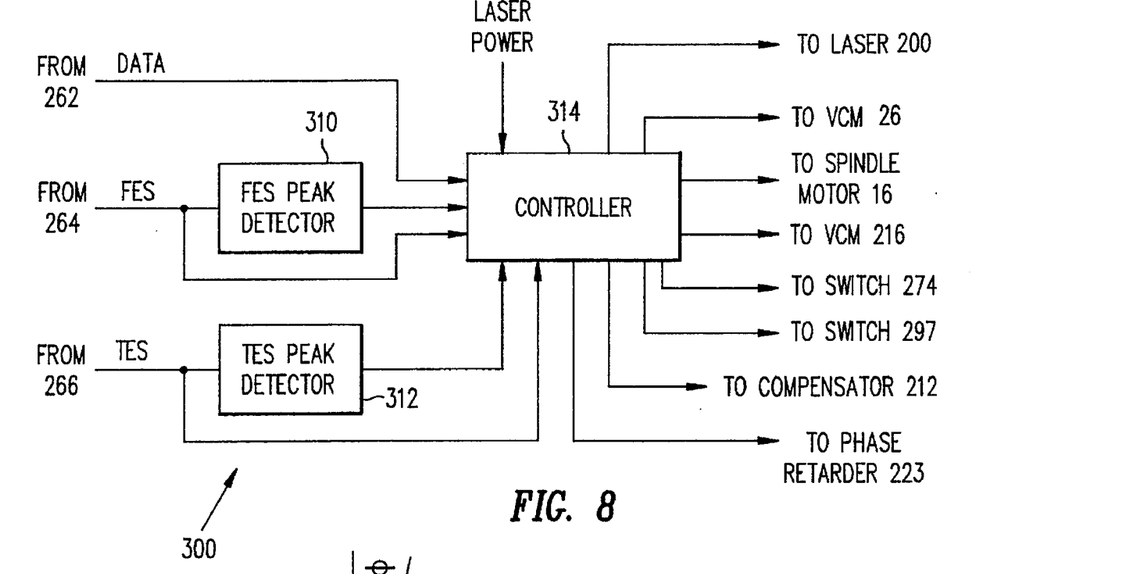
FIG. 8 is a schematic diagram of a controller circuit of the present invention.

FIG. 8 is a schematic diagram of a controller system of the present invention and is designated by the general reference number 300. A focus error signal (FES) peak detector 310 is connected to the focus error signal circuit 264. A track error signal (TES) peak detector 312 is connected to the tracking error signal circuit 266. A controller 314 is connected to detector 310, detector 312, detector 207 and circuits 262, 264 and 266. Controller 314 is a microprocessor based disk drive controller. Controller 314 is also connected to and controls the laser 200, head motor 26, spindle motor 16, focus motor 216, switches 274 and 297, compensator 212, and phase retarder 223.

Figure 9:
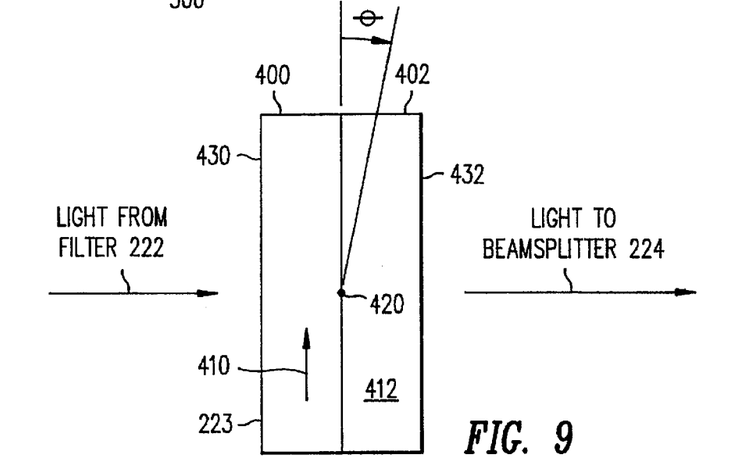
FIG. 9 is a side view of the phase retarder of FIG. 5.

FIG. 9 shows a detailed side view of the phase retarder 223. Phase retarder 223 is comprised of a pair of birefringent crystals 400 and 402. The two crystals 400 and 402 are attached together with a transparent optical cement. Crystal 400 is oriented with its optical axis 410 (crystal a-axis) aligned vertically as shown. Crystal 402 is oriented with its optical axis 412 normal to the plane of the drawing of FIG. 9.

The center of the retarder 223 has an axis of rotation 420 which is perpendicular to the axis of the beam of light from filter 222. The retarder 223 rotates about axis 420 at an angle θ. The retarder has external surfaces 430 and 432 which are normal to the light from filter 222 when θ equals 0°. The total thickness of retarder 223 is chosen such that light from filter 222 experiences 0° of phase shift when passing through retarder 223 when θ equals 0°. In a preferred embodiment the crystal 430 is 1 mm thick, crystal 432 is 1 mm thick and the combined thickness equals 2 mm.

Figure 10:
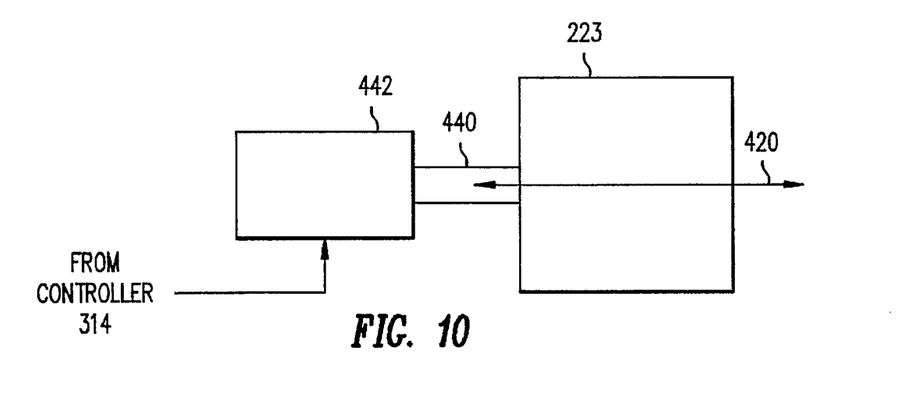
FIG. 10 is a front view of the phase retarder of FIG. 5.

FIG. 10 shows a front view of retarder 223. Retarder 223 is connected to a shaft 440 which is aligned along axis 420. A rotary motor 442 is connected to shaft 440 and causes retarder 223 to rotate about axis 420. The motor 442 is connected to and controlled by controller 314.

During operation, the controller 314 adjusts the retarder 223 to have the proper angle with respect to each type of magneto-optical medium with which is being used. The angle θ is adjusted such that elliptically polarized light from filter 222 is converted to linearly polarized light when passed to beam splitter 224. For example, for the medium described in Table I, a 90° phase shift is achieved by setting θ equal to 17°, a 65° phase shift is achieved by setting θ equal to 14°. For a single magneto-optical layer medium of the prior art, θ is set to 0°.

The general operation of system 10 may now be understood. Controller 314 causes motor 16 to rotate disk 12 and causes motor 26 to move head 22 to the proper position below disk 12. See FIG. 5. Laser 200 is energized to read data from disk 12. The beam 202 is focussed by lens 210 on the data surface 92. Reflected beam 220 returns and is divided into beams 230, 242 and 244. Beam 230 is detected by detector 234 and is used to provide focus and tracking error information and beams 242 and 244 are detected by detectors 248 and 252, respectively, and are used to provide data signals. The controller 314 sets retarder 223, as explained above, in order to achieve an optimum data signal for the type of media which is used.

See FIG. 6. When beam 202 is exactly focussed on data surface 96, beams 230 will have a circular cross section 350 on detector 234. This will cause circuit 264 to output a zero focus error signal. If beam 202 is slightly out of focus one way or the other, beam 230 will fall as an oval pattern 352 or 354 on detector 234. This will cause circuit 264 to output a positive or negative focus error signal. Controller 314 will use the focus error signal to control motor 216 to move lens 210 until the zero focus error signal is achieved.

If beam 202 is focussed exactly on the track of data surface 96, then beam 230 will fall as a circular cross section 350 equally between the sections A and B, and sections C and D. The data surfaces 90 and 92 of medium 12 have circular or spiral tracking grooves as are known in the art. If the beam is off track it falls on the boundary of one of these tracking grooves. The result is that the beam is diffracted and cross section 350 will move up or down. More light will be received by sections A and B, and less by section C and D or vice versa.

The resulting tracking error signal is used by controller 314 to adjust the position of head 22 using voice coil motor 26. Controller 314 may set switch 297 such that the beam tracks on the tracking groove as opposed to the space between the tracks. Controller 314 may also cause data to be read from data surface 90 by moving lens 210 such that beam 202 is now focussed on surface 90. The general operation of a multiple data layer disk drive is more fully explained in the above referenced patent.

Disk 12 has magneto-optical data surfaces. Polarization detection is used to read the data. Switch 274 is set to connect amplifier 278. The difference in the orthogonal polarization light detected at detectors 248 and 252 provide the data signal. Alternatively, controller 314 may set switch 274 to connect amplifier 276 when it is desired to read a single or a multiple data surface medium which has ROM or WORM type of data surfaces and where data is detected by changes in reflectivity.

While the preferred embodiments of the present invention have been illustrated in detail, it should be apparent that modifications and adaptation to those embodiments may occur to one skilled in the art without departing from the scope of the present invention as set forth in the following claims.

We claim:

1. An optical data storage system comprising: a substrate; a first dielectric layer overlying the substrate;

a first magneto-optical layer overlying the first dielectric layer, the first magneto-optical layer being of a thickness which allows the transmission of a radiation beam;

a second dielectric layer overlying the first magneto-optical layer;

a radiation transmissive layer overlying the second dielectric layer;

a third dielectric layer overlying the radiation transmissive layer;

a second magneto-optical layer overlying the third dielectric layer;

a fourth dielectric layer overlying the second magneto-optical layer; and wherein the first dielectric layer has a thickness range of 0<166 (±½ n) nanometers, the second dielectric layer has a thickness range of 80–160 (±½ n) nanometers, the third dielectric layer has a thickness range of 80–250 (±½ n) nanometers, and the fourth dielectric layer has a thickness range of 90–240 (±½ n) nanometers, wherein l equals the wavelength of light used with the system and n equals the real part of the index of refraction of the dielectric layer material.

2. The system of claim 1, wherein the radiation transmissive layer is comprised of air.

3. The system of claim 1, wherein the radiation transmissive layer is comprised of a solid light transmissive material.

4. The system of claim 1, wherein the first dielectric layer has a thickness range of 0<78 (±½ n) nanometers, the second dielectric layer has a thickness range of 23–64 (±½ n) nanometers, the third dielectric layer has a thickness of 80–250 (±½ n) nanometers, and the fourth dielectric layer has a thickness range of 90–240 (±½ n) nanometers, wherein l equals the wavelength of light used with the system and n equals the real part of the index of refraction of the dielectric layer material.

5. The system of claim 1, wherein the first dielectric layer has a thickness of 95–170 (±½ n) nanometers, the second dielectric layer has a thickness range of 85–150 (±½ n) nanometers, the third dielectric layer has a thickness range of 85–250 (±½ n) nanometers, and the fourth dielectric layer has a thickness range of 105–215 (±½ n) nanometers, wherein l equals the wavelength of light used with the system and n equals the real part of the index of refraction of the dielectric layer material.

6. The system of claim 1, wherein the first dielectric layer has a thickness of 0<160 (±½ n) nanometers, the second dielectric layer has a thickness range of 35–115 (±½ n) nanometers, the third dielectric layer has a thickness range of 110–210 (±½ n) nanometers, and the fourth dielectric layer has a thickness range of 25–120 (±½ n) nanometers, wherein l equals the wavelength of light used with the system and n equals the real part of the index of refraction of the dielectric layer material.

7. The system of claim 1, wherein the first dielectric layer has a thickness of 0<160 (±½ n) nanometers, the second dielectric layer has a thickness range of 35–115 (±½ n) nanometers, the third dielectric layer has a thickness range of 80–130 (±½ n) nanometers, and the fourth dielectric layer has a thickness range of 150–170 (±½ n) nanometers, wherein l equals the wavelength of light used with the system and n equals the real part of the index of refraction of the dielectric layer material.

8. The system of claim 1, wherein the first dielectric layer has a thickness of 10–140 (±½ n) nanometers, the second dielectric layer has a thickness range of 20–130 (±½ n) nanometers, the third dielectric layer has a thickness range of 105–210 (±½ n) nanometers, and the fourth dielectric layer has a thickness range of 30–125 (±½ n) nanometers, wherein l equals the wavelength of light used with the system and n equals the real part of the index of refraction of the dielectric layer material.

9. An optical data storage system comprising: an optical data storage medium comprising a substrate, a first dielectric layer overlying the substrate, a first magneto-optical layer overlying the first dielectric layer, the first magneto-optical layer being of a thickness which allows the transmission of a radiation beam, a second dielectric layer overlying the first magneto-optical layer, a radiation transmissive layer overlying the second dielectric layer, a third dielectric layer overlying the radiation transmissive layer, a second magneto-optical layer overlying the third dielectric layer; and a fourth dielectric layer overlying the second magneto-optical layer, a radiation source for producing a radiation beam;

a radiation transmission device for transmitting the radiation beam to the medium; and a radiation reception device for receiving a return radiation beam from the medium and generating a data signal responsive thereto, wherein the first dielectric layer has a thickness range of 0<166 (±½ n) nanometers, the second dielectric layer has a thickness range of 80–160 (±½ n) nanometers, the third dielectric layer has a thickness range of 80–250 (±½ n) nanometers, and the fourth dielectric layer has a thickness range of 90–240 (±½ n) nanometers, wherein l equals the wavelength of light used with the system and n equals the real part of the index of refraction of the dielectric layer material.

10. The system of claim 9, wherein the radiation reception device includes a phase retarder.

11. The system of claim 9, wherein the radiation transmissive layer is comprised of air.

12. The system of claim 9, wherein the radiation transmissive layer is comprised of a solid light transmissive material.

13. The system of claim 9, wherein the first dielectric layer has a thickness range of 0<78 (±½ n) nanometers, the second dielectric layer has a thickness range of 23–64 (±½ n) nanometers, the third dielectric layer has a thickness of 80–250 (±½ n) nanometers, and the fourth dielectric layer has a thickness range of 90–240 (±½ n) nanometers, wherein l equals the wavelength of light used with the system and n equals the real part of the index of refraction of the dielectric layer material.

14. The system of claim 9, wherein the first dielectric layer has a thickness of 95–170 (±½ n) nanometers, the second dielectric layer has a thickness range of 85–150 (±½ n) nanometers, the third dielectric layer has a thickness range of 85–250 (±½ n) nanometers, and the fourth dielectric layer has a thickness range of 105–215 (±½ n) nanometers, wherein l equals the wavelength of light used with the system and n equals the real part of the index of refraction of the dielectric layer material.

15. The system of claim 9, wherein the first dielectric layer has a thickness of 0<160 (±½ n) nanometers, the second dielectric layer has a thickness range of 35–115 (±½ n) nanometers, the third dielectric layer has a thickness range of 110–210 (±½ n) nanometers, and the fourth dielectric layer has a thickness range of 25–120 (±½ n) nanometer, wherein l equals the wavelength of light used with the system and n equals the real part of the index of refraction of the dielectric layer material.

16. The system of claim 9, wherein the first dielectric layer has a thickness of 0<160 (±½ n) nanometers, the second dielectric layer has a thickness range of 35–115 (±½ n) nanometers, the third dielectric layer has a thickness range of 80–130 (±½ n) nanometers, and the fourth dielectric layer has a thickness range of 150–170 (±½ n) nanometers, wherein l equals the wavelength of light used with the system and n equals the real part of the index of refraction of the dielectric layer material.

17. The system of claim 9, wherein the first dielectric layer has a thickness of 10–140 (±½ n) nanometers, the second dielectric layer has a thickness range of 20–130 (±½ n) nanometers, the third dielectric layer has a thickness range of 105–210 (±½ n) nanometers, and the fourth dielectric layer has a thickness range of 30–125 (±½ n) nanometers, wherein I equals the wavelength of light used with the system and n equals the real part of the index of refraction of the dielectric layer material.

18. An optical data storage system comprising:
- a device for receiving an optical data storage medium having at least two separate magneto-optical data layers;
- a radiation source for producing a radiation beam;
- a radiation transmission device for transmitting the radiation beam to the medium; and
- a radiation reception device for receiving a return radiation beam from the medium and generating a data signal responsive thereto, wherein the radiation reception device includes a phase retarder for adjusting the relative phase of the polarization components of the return beam.

19. The system of claim 18, wherein the phase retarder comprises a pair of birefringent crystals which are rotatably mounted.

20. They system of claim 18, wherein the phase retarder is adjustable and may be controlled to provide variable amounts of phase retardation for use with different types of magneto-optical media.

21. The system of claim 18, further comprising a movement device for moving the optical data storage medium relative to the radiation beam.

22. An optical data storage system comprising: a substrate;

- a first dielectric layer overlying the substrate;
- a first magneto-optical layer overlying the first dielectric layer, the first magneto-optical layer being of a thickness which allows the transmission of a radiation beam;
- a second dielectric layer overlying the first magneto-optical layer;
- a radiation transmissive layer overlying the second dielectric layer;
- a third dielectric layer overlying the radiation transmissive layer;
- a second magneto-optical layer overlying the third dielectric layer; and
- a fourth dielectric layer overlying the second magneto-optical layer; wherein each dielectric layer has a thickness range including a minimum thickness and wherein the minimum thickness for the dielectric layers increases from the first dielectric layer to the fourth dielectric layer.

23. An optical data storage system comprising: an optical data storage medium comprising a substrate,
- a first dielectric layer overlying the substrate, a first magneto-optical layer overlying the first dielectric layer, the first magneto-optical layer being of a thickness which allows the transmission of a radiation beam, a second dielectric layer overlying the first magneto-optical layer, a radiation transmissive layer overlying the second dielectric layer, a third dielectric layer overlying the radiation transmissive layer, a second magneto-optical layer overlying the third dielectric layer; a fourth dielectric layer overlying the second magneto-optical layer, and a reflector layer overlying the fourth dielectric layer;
- a radiation source for producing a radiation beam;
- a radiation transmission device for transmitting the radiation beam to the medium; and
- a radiation reception device for receiving a return radiation beam from the medium and generating a data signal responsive thereto,
- wherein each dielectric layer has a thickness range including a minimum thickness and wherein the minimum thickness for the dielectric layers increases from the first dielectric layer to the fourth dielectric layer.

* * * * *